Patented May 25, 1926.

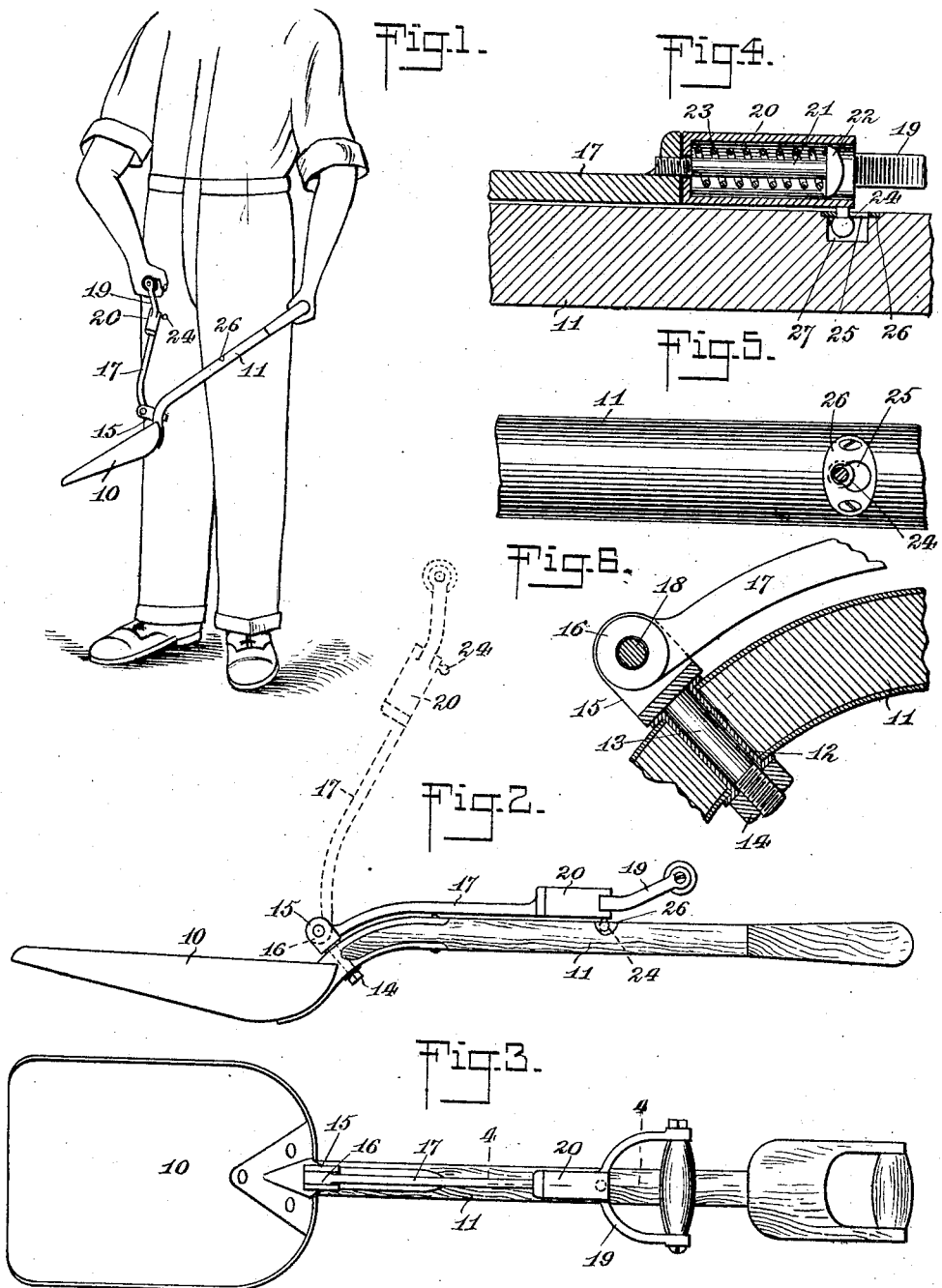

1,586,056

UNITED STATES PATENT OFFICE.

ARTHUR Q. WALSH, OF HARTSDALE, NEW YORK.

ATTACHMENT FOR SHOVELS.

Application filed April 18, 1925. Serial No. 24,122.

This invention relates to an attachment for a shovel. An object of the invention concerns the provision of means whereby the shovel can be handled without the necessity of the operator bending over as much as is usually the case.

Another object concerns the provision of an attachment which can be so connected to the shovel that it will allow the utmost freedom in the manipulation of the shovel.

A further object concerns the provision of means whereby the attachment can be locked in close association with the main handle of the shovel when not in use.

The invention is illustrated in the drawings, of which—

Figure 1 shows the shovel and the attachment in the hands of an operator;

Fig. 2 is a side elevation of the shovel with the attachment applied;

Fig. 3 is a plan view;

Fig. 4 is a section on the line 4—4 of Fig. 3;

Fig. 5 is a plan view of a portion of the handle of the shovel; and

Fig. 6 is a section showing the manner in which the attachment is connected to the shovel.

The form of the invention shown in the drawings is a preferred form, although it is understood that modifications in the construction and arangement of the parts and in the character of the materials used may be adopted without departing from the spirit of the invention as set forth in the appended claims.

The preferred form of the invention as shown in the drawings is adapted to be attached to a shovel having a blade portion 10 and a handle portion 11. The handle portion 11, near the blade 10, is provided with an aperture in which a bearing sleeve 12 is mounted. This sleeve is adapted to receive a bolt 13 fastened therein by means of a nut 14. The bolt, on the other hand, is provided with a yoke head 15 in which the end 16 of an auxiliary handle 17 is pivotally mounted on a pin 18. The other end of the auxiliary handle portion is provided with a hand-grip 19 connected to a cylinder 20 adapted to move with respect to the handle portion 17. A stem 21 having a head 22 is connected to the handle 17. Beneath the head 22 within the cylinder 20 a spring 23 is disposed. The cylinder 20 is provided with a projection 24 on its lateral wall adapted to engage in a bayonet slot 25 formed in a plate 26 fastened over the top of a recess 27 in the handle portion 11.

The auxiliary handle 17, by being pivoted on the bolt 13, and by reason of the rotatability of the bolt 13, can be moved with respect to the handle 11 to any position desired with respect to said handle 11. Therefore, when the operator is manipulating the shovel, the auxiliary handle is capable of movement in a variety of planes and directions, permitting him the utmost freedom in the manipulation thereof.

When the shovel is not in use the auxiliary handle is latched to the main handle in the manner described. By having the auxiliary handle pivotally connected near the blade of the shovel the load can as easily, if not more easily, be carried and the operator is not required to bend over so much, whereby the labor of shoveling is considerably reduced.

What I claim is:—

1. In combination with a shovel having a main handle with a recess therein, a plate having a bayonet slot therein disposed over the recess, an auxiliary handle pivoted to the shovel, a projection on said handle, said projection slidable with respect to the auxiliary handle and engageable in the bayonet slot to latch the auxiliary handle to the main handle.

2. An attachment for shovels having a blade and a main handle attached thereto which comprises a bolt passing through the main handle closely adjacent to blade and rotatably mounted thereon and an auxiliary handle pivoted to the bolt.

3. An attachment for shovels having a blade and a main handle attached thereto which comprises a bolt passing through the main handle closely adjacent to blade and rotatably mounted thereon, an auxiliary handle pivoted to the bolt, and means for latching auxiliary handle to the main handle when desired.

4. An attachment for shovels having a blade and a main handle attached thereto which comprises a bolt passing transversely through the handle closely adjacent the blade, said bolt being rotatably mounted thereon, an auxiliary handle pivotally connected to the bolt and a rotatable hand grip on the end of the auxiliary handle.

5. An attachment for shovels having a blade and a main handle attached thereto which comprises a bolt passing transversely through the handle closely adjacent the blade, said bolt being rotatably mounted thereon, an auxiliary handle pivotally connected to the bolt, a rotatable hand grip on the end of the auxiliary handle, and means for latching the auxiliary handle to the main handle when desired.

6. An attachment for shovels having a blade and a main handle attached thereto which comprises a bolt rotatably passing through the main handle closely adjacent to blade, an auxiliary handle pivoted to the bolt, a rotatable hand grip mounted on the end of the auxiliary handle, spring means connecting the hand grip with the auxiliary handle for the purpose of assisting in lifting a load disposed on the blade, and means for latching the hand grip to the main handle when desired.

ARTHUR Q. WALSH.